(12) United States Patent
Prince et al.

(10) Patent No.: US 10,918,998 B2
(45) Date of Patent: Feb. 16, 2021

(54) FUNCTIONALIZED SINGLE-LAYER GRAPHENE-BASED THIN FILM COMPOSITE AND METHOD OF PRODUCING THE SAME

(71) Applicant: NGEE ANN POLYTECHNIC, Singapore (SG)

(72) Inventors: James Antony Prince, Singapore (SG); Sowrirajalu Bhuvana, Singapore (SG); Xiaoxiao Song, Singapore (SG); Gurdev Singh, Singapore (SG)

(73) Assignee: NGEE ANN POLYTECHNIC, Singapore (SG)

( * ) Notice: Subject to any disclaimer, the term of this patent is extended or adjusted under 35 U.S.C. 154(b) by 624 days.

(21) Appl. No.: 15/568,370

(22) PCT Filed: Apr. 20, 2016

(86) PCT No.: PCT/SG2016/050185
§ 371 (c)(1),
(2) Date: Oct. 20, 2017

(87) PCT Pub. No.: WO2016/171622
PCT Pub. Date: Oct. 27, 2016

(65) Prior Publication Data
US 2018/0147545 A1      May 31, 2018

(30) Foreign Application Priority Data
Apr. 20, 2015 (SG) .............................. 10201503074T

(51) Int. Cl.
*B01D 69/02* (2006.01)
*B01D 69/06* (2006.01)
(Continued)

(52) U.S. Cl.
CPC ............. *B01D 69/02* (2013.01); *B01D 69/06* (2013.01); *B01D 69/08* (2013.01); *B01D 69/125* (2013.01);
(Continued)

(58) Field of Classification Search
CPC ........ B01D 69/02; B01D 69/06; B01D 69/08; B01D 69/125; B01D 71/56; B01D 71/82;
(Continued)

(56) References Cited

U.S. PATENT DOCUMENTS

| 2012/0080381 A1 | 4/2012 | Wang et al. |
| 2013/0190449 A1* | 7/2013 | Kinloch ................. C01B 32/23 525/50 |
| 2015/0224450 A1 | 8/2015 | Jassby et al. |

FOREIGN PATENT DOCUMENTS

| CN | 102600734 A | 7/2012 |
| KR | 20130079840 A | 7/2013 |

(Continued)

OTHER PUBLICATIONS

International Search Report and Written Opinion on corresponding PCT application (PCT/SG2016/050185) from International Searching Authority (AU) dated May 31, 2016.

*Primary Examiner* — Daniel C. McCracken
(74) *Attorney, Agent, or Firm* — BakerHostetler

(57) ABSTRACT

A functionalized single-layer graphene-based thin film composite and method of producing the same are disclosed. Furthermore, a functionalized single-layer graphene-based thin film composite having water channels for low pressure desalination and method of producing the same are disclosed.

16 Claims, 14 Drawing Sheets

(51) Int. Cl.
*B01D 69/08* (2006.01)
*B01D 69/12* (2006.01)
*B01D 71/56* (2006.01)
*B01D 71/82* (2006.01)
*C02F 1/44* (2006.01)
*B01D 71/02* (2006.01)

(52) U.S. Cl.
CPC .............. *B01D 71/56* (2013.01); *B01D 71/82* (2013.01); *C02F 1/44* (2013.01); *C02F 1/444* (2013.01); *B01D 71/021* (2013.01); *C02F 2305/08* (2013.01); *Y02A 20/131* (2018.01)

(58) Field of Classification Search
CPC .......... B01D 71/021; C02F 1/444; C02F 1/44; C02F 2305/08; Y02A 20/131
See application file for complete search history.

(56) References Cited

FOREIGN PATENT DOCUMENTS

| WO | WO 2014/168629 | * 10/2014 | ............. B01D 69/14 |
| WO | WO 2014/168629 A1 | 10/2014 | |

* cited by examiner

FUNCTIONALIZED SINGLE-LAYER GRAPHENE-BASED THIN FILM COMPOSITE AND METHOD OF PRODUCING THE SAME

CROSS REFERENCED APPLICATIONS

This application is a national stage application of PCT Application No. PCT/SG2016/050185, filed Apr. 20, 2016, and claims priority to Singapore Patent Application No. 10201503074T, filed Apr. 20, 2015. The content of both of these applications is hereby incorporated by reference as if set forth in their entirety herewith.

FIELD OF THE INVENTION

This invention relates to a functionalized single-layer graphene-based thin film composite and method of producing the same. More particularly, this invention relates to a functionalized single-layer graphene-based thin film composite comprising water channels for low pressure desalination and method of producing the same.

BACKGROUND

Water is needed by every living object on the earth. Fresh water shortage around the world is increasing at a rapid rate due to the human population growth and the scarcity of fresh water resources. United Nations' FAO states that by 2025, around 1.8 billion people will be living in countries or regions with water scarcity and UNICEF has estimated that 2,000 children under the age of five die every day from diarrheal diseases and of these some 1,800 deaths are linked to water, sanitation and hygiene. Even though, almost 71% (by volume) of the earth is covered by water, 97% of which is seawater (salt water) and is inconsumable. The remaining 3% of the earth water sources is considered fresh water. However, 98.8% of the 3% is found in polar caps and underground. Only about 0.03% of the world's total water can be accessed by humans, making fresh water a scarce resource. Since such a high percentage of the earth is filled with seawater, converting seawater into potable water will solve many of the water shortage problems.

The Global market for water treatment, distribution and collection for domestic and industrial uses is US$556.8 billion. The current global desalination market is US$15 billion per year with a compound annual growth rate (CAGR) of 13%. FIG. 1 shows the growth of the desalination market over recent years.

With the growing demand for high quality water, many new technologies of desalination are being developed to cater for potable and non-potable use from seawater and other water sources. The conventional thermal desalination processes such as multi-stage flash (MSF), multiple effect evaporation (MEE) and thermal or mechanical vapor compression (VC) are too costly and energy inefficient due to high energy consumption rates. Reverse osmosis (RO) is currently the most popular method of desalination.

The first commercially viable reverse osmosis (RO) membrane technology developed at UCLA in the 1950s and 1960s made feasible the production of fresh water from saline water sources, but was replaced in the 1970s and 1980s by more efficient composite membranes comprised of a thin (nano-scale) polymer film cast on top of a porous polymeric support. A thin film composite (TFC) is a reverse osmosis membrane composed of and manufactured as three layers bonded together (see FIG. 2). The two base layers of the asymmetric design have a thin skin (3rd) layer of either polyamide or charged polysulfone deposited on the surface. The thin film is the salt rejecting layer where the two base layers provide a porous structure whose primary function is strength.

Over thirty years later, thin film composite (TFC) membranes remain the state-of-the-art in RO membrane technology. While modern TFC membranes produce very pure water from highly contaminated sources (e.g., wastewater, seawater), energy consumption and high water production costs inhibit widespread implementation. Another main drawback of this conventional TFC coating using Meta phenylene diamine (MPD) and trimesoyl chloride (TMC) is their poor resistance against the oxidizing agents such as chlorine, which is a widely used economical disinfectant in desalination processes. (*Journal of Membrane Science* 403-404 (2012) 152-161). FIG. 3 shows a typical thin film composite (TFC) reaction.

Since the development of the first synthetic membrane around 50 years ago in 1964 by Loeb and Sourirajan, membrane-based filtration systems have led to their proliferation in desalination and wastewater treatment due to its reliability and ease of operation. Apart from RO membranes, biologically inspired materials (Block copolymer, hydroxylated graphene/graphene oxide and carbon nanotubes and aquaporin) based membranes are getting much attention in desalination.

It is therefore desirable to provide a functionalized single-layer graphene-based thin film composite comprising water channels and a method of producing the same that seek to address at least one of the problems described hereinabove, or at least to provide an alternative.

SUMMARY OF INVENTION

In accordance with a first aspect of this invention, a functionalized single-layer graphene-based thin film composite is provided. The functionalized single-layer graphene-based thin film composite comprises a first component having at least an amine functional group and a second component having at least a —COCl (acid chloride) functional group that forms amide linkages with the first component to form a plurality of water channels within the thin film composite, wherein at least one of the said components is a graphene, functionalized with said functional group.

In accordance with a second aspect of this invention, a graphene-based thin film composite membrane is provided. The graphene-based thin film composite membrane comprises a porous substrate; and a functionalized single-layer graphene-based thin film composite comprising a first component having at least an amine functional group and a second component having at least a —COCl functional group that forms amide linkages with the first component to form a plurality of water channels within the thin film composite, wherein at least one of the said components is a graphene, functionalized with said functional group.

In accordance with a third aspect of this invention, a method of producing a functionalized single-layer graphene-based thin film composite membrane is provided. The method comprises pretreating the surface of a porous substrate membrane with a first component having at least an amine functional group; drying the pretreated porous substrate membrane; and contacting the pretreated porous substrate membrane with a second component having at least a —COCl functional group that forms amide linkages with the first component deposited onto the surface of the porous substrate to form a thin film composite layer having a plurality of water channels on the said porous substrate.

In accordance with an embodiment of this invention, the first component is a graphene, functionalized with amine and acid functional groups and the second component is an acid chloride modified graphene.

In accordance with an embodiment of this invention, the first component is a graphene, functionalized with amine and acid functional groups and the second component is trimesoyl chloride.

In accordance with an embodiment of this invention, the first component is meta phenylene diamine and the second component is an acid chloride modified graphene.

In accordance with an embodiment of this invention, the plurality of water channels having an average diameter ranging from 0.001 nm to 100 nm, preferably 0.01 nm to 20 nm.

In accordance with an embodiment of this invention, the porous substrate is an ultrafiltration membrane or a microfiltration membrane fabricated from material selected from the group consisting of polysulfone, cellulose acetate, polyvinyl alcohol, polyvinyl chloride, polyvinylidene fluoride, cellulose nitrate, polyethersulphone and poly acrylonitrile.

In accordance with an embodiment of this invention, the functionalized single-layer graphene-based thin film composite having a thickness ranging from 2 nm to 2,000 nm.

BRIEF DESCRIPTION OF THE DRAWINGS

The above advantages and features of a method and apparatus in accordance with this invention are described in the following detailed description and are shown in the drawings:

FIG. 18(d) shows is a higher magnified image (60,000×) illustrating that the modified graphene has a layer-by-layer stacked structure that is formed by the TFC crosslinking.

DETAILED DESCRIPTION

The aim of various embodiments of this invention is to develop a novel robust biomimetic membrane using hydroxyl, carboxyl and amine functional groups containing graphene for low pressure desalination (nanofiltration (NF) and reverse osmosis (RO) applications). The new functionalized graphene-based membrane is aimed as a disruptive technology to the conventional desalination methods.

Current State of Art: Graphene-Based Membranes

Figure 1:
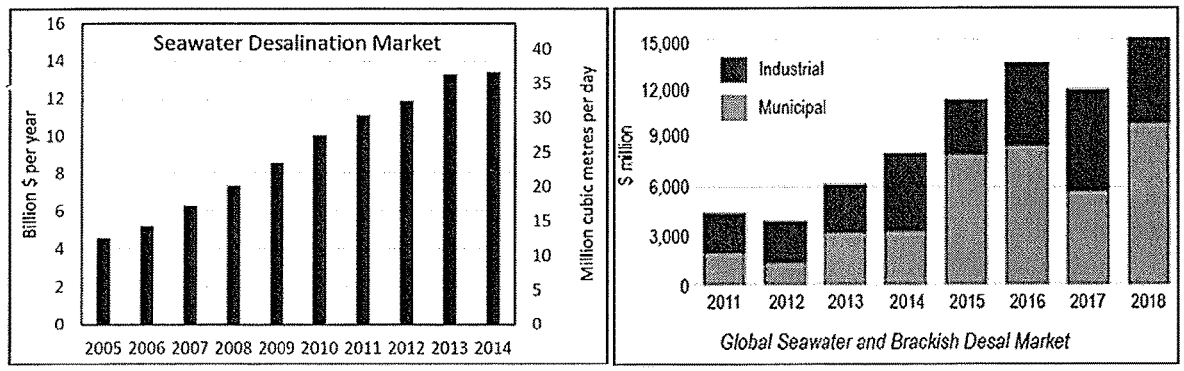
FIG. 1 shows the growth of desalination market.
Figure 2:
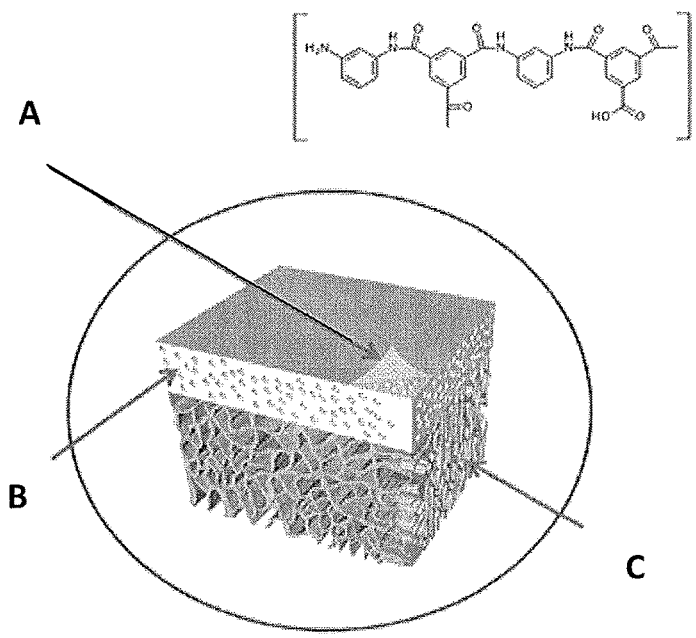
FIG. 2 illustrates a thin film composite (TFC) membrane on support.
Figure 3:
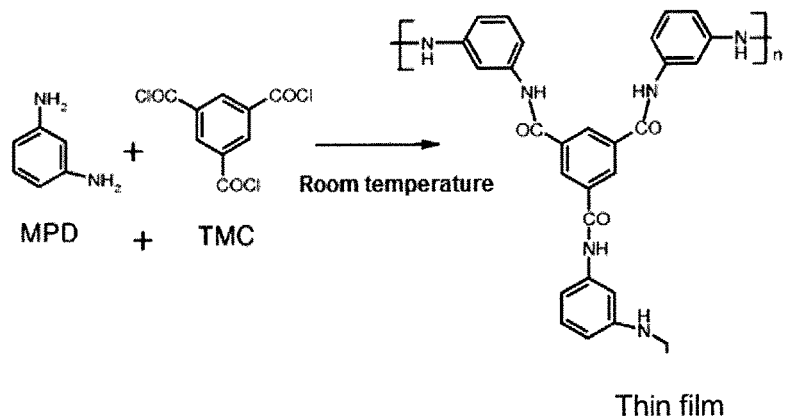
FIG. 3 shows a typical thin film composite (TFC) reaction.
Figure 4:
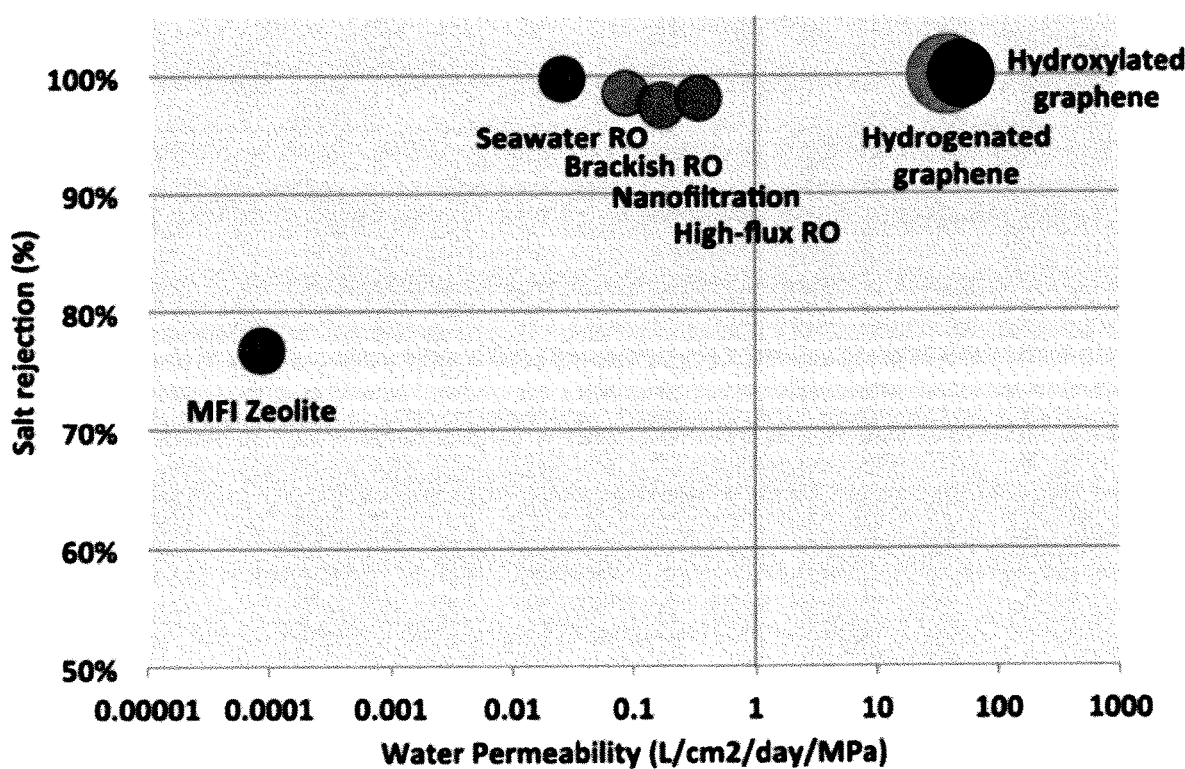
FIG. 4 shows the performance analysis of graphene-based membranes over conventional membranes, in terms of permeability and selectivity.

Recently, graphene has gained much attention in the field of membrane science and engineering due to its high surface area, mechanical strength and chemical stability. Theoretical analysis has also predicted that graphene-based membranes may exhibit 2-3 orders of magnitude higher permeability than the current state of the art membranes. FIG. 4 shows the performance of graphene-based membranes over conventional membranes—in terms of permeability and selectivity (Cohen-Tanugi D et al., Nano Letters, 12, p. 3602-3608). However, experimental studies show that there are limitations in achieving such improved permeability due to the challenges associated with the fabrication of leak-free porous graphene membranes with very large surface area.

In recent years, carbon nanotubes and graphene have been viewed as new types of nanofillers to improve the selectivity and the separation performance of polymeric ultrafiltration (UF) membranes due to the interaction of contaminants with the delocalized p-electrons of the nanocarbons. It is also reported that the nanocarbon based fillers enhance the thermal stability and mechanical strength of the polymeric membranes. However, it is commonly accepted that supported graphene is hydrophobic (contact angle >90°) in nature and its water contact angle is, to some extent, higher than that of graphite. Moreover, these fillers are normally associated with relatively poor dispersion within the polymer matrix.

Graphene oxide (GO) is an amphiphilic graphene derivative (a single-atom layer of graphene) with oxygen containing functional groups (—OH, —COOH) attached to both sides of the graphene flake. With the addition of the oxygen groups, the double bonds holding the carbon atoms together can break more easily, resulting in the loss of the material's electrical conductivity. However, there are important beneficial aspects to having these oxygen containing functional groups attached to the graphene structure. Firstly, they impart polarity to the flake so that the graphene oxide is able to be more uniformly dispersed in solvents and eventually in the polymer matrix it is blended into. Further, these oxygen containing hydrophilic functional groups improve the wetting properties (hydrophilic properties) of the normally hydrophobic polymeric membranes through hydrogen bonding. Indeed, literature reports that the contact angle of water on pristine graphene oxide films can vary from 0 (by theory) to 60 (by experiment) degrees. In addition, it has been proven that hydroxylated graphene will give a 3-fold higher permeability than conventional RO membrane (Cohen-Tanugi D et al., *Nano Letters*, 12, p. 3602-3608).

Even though graphene and its derivatives have been shown to exhibit the potential for better performance, the use of these material based membranes in real applications is still a dream due to their hydrophobicity and limitations in the fabrication process.

Development of Ultra-Wetting Graphene-Based Membrane

Generally, synthetic biomimetic membranes are made up of two layers such as nanoporous support layer and a thin selective aquaporin or functional material (block copolymer with desired functional groups/aligned carbon nanotubes/single layer hydroxylated graphene) based layer. However, the stability, that is, the attachment to the support layer and the uniformity of the biomimetic layer (defect free layer) on the support layer is still a challenge. In addition to these, the wettability of the support layer is also critical for low pressure applications. Reduced resistance is required for low pressure application.

In order to overcome these challenges, a functionalized single-layer graphene-based thin film composite (TFC) coating has been developed to form synthetic water channels onto any ultrafiltration (UF) and/or microfiltration (MF) membrane surface to enable the membranes for use in low pressure desalination (NF/RO applications).

In accordance with an embodiment of the present invention, the functionalized single-layer graphene-based thin film composite comprises a first component having at least an amine functional group and a second component having at least a —COCl functional group that forms amide linkages with the first component to form a plurality of water (or fluid) channels within the thin film composite, wherein at least one of the components is graphene, functionalized with the said functional group.

"Graphene" as used herein refers to, for example, exfoliated graphene nanoplatelets, pristine graphene, graphene nanosheets, functionalized graphene, chemically converted graphene, and combinations thereof. The graphene may also include any nanocarbon materials such as single-walled carbon nanotubes, multi-walled carbon nanotubes, and graphite that requires further processing to obtain single-layer graphene.

The term "graphene-based membrane" as used herein refers to, for example, membrane that is fabricated from graphene, such as exfoliated graphene nanoplatelets, pristine graphene, functionalized graphene, chemically converted graphene, graphene nanosheets, and combinations thereof.

The first component can be a graphene, functionalized with at least an amine functional group or a compound containing at least an amine functional group. In one embodiment of the invention, the first component is an amine and acid functionalized graphene. The amine and acid functionalized graphene is prepared by functionalizing graphene nanosheets with acid and amine functional groups to bring its water contact angle to zero. In another embodiment, the first component is meta phenylene diamine.

The second component can be a graphene, functionalized with at least a —COCl functional group or a compound containing at least a —COCl functional group that forms amide linkages with the first component. In one embodiment, the second component is an acid chloride modified graphene. In another embodiment, the second component is trimesoyl chloride.

In all embodiments, at least one of the two components must be a graphene, functionalized with the said functional group.

Preferably, the graphene nanosheets that are used to produce the thin film composite have a thickness between 2 to 10 nm. The amide linkages that are formed between the first and the second components form a plurality of synthetic water channels (or fluid channels) within the thin film composite. In one embodiment, the water channels have an average diameter of 0.001 to 100 nm, preferably 0.01 to 20 nm. The diameter of the water channels may vary according to the particular application in which the thin film composite is used. The diameter of the water channels can be varied using different sizes of graphene flakes used for producing the thin film composite and/or different thickness of the layer. The functionalized single-layer graphene-based thin film composite in accordance with of the present invention can have a thickness ranging from 2 nm to 2,000 nm. In one embodiment, the different thickness of the thin film composite is formed by having layers of graphene nanosheets overlay one on top of another. The layers of graphene nanosheets are functionalized and cross-linked to form the single-layer thin film composite. The functionalized single-layer graphene-based thin film composite of in accordance with some embodiments of the present invention can be applied to any substrate or membrane surface to form synthetic water channels on the substrate or membrane to enable its application in low pressure desalination.

In accordance with another aspect of the invention, a graphene-based thin film composite membrane is provided. The graphene-based thin film composite membrane comprises a porous substrate and a functionalized single-layer graphene-based thin film composite comprising a first component having at least an amine functional group and a second component having at least a —COCl functional group that forms amide linkages with the first component to form a plurality of water channels within the thin film composite, wherein at least one of the said components is a graphene, functionalized with said functional group.

The porous substrate may be comprised of any porous material suitable for use in low pressure desalination. The substrate may also be an ultrafiltration membrane or microfiltration membrane fabricated from any suitable materials including, but not limited to polysulfone (PS), cellulose acetate (CA), polyvinyl alcohol (PVA), polyvinyl chloride (PVC), polyvinylidene fluoride (PVDF), cellulose nitrate (CN), polyethersulphone (PES) and poly acrylonitrile (PAN).

The some embodiments of the present invention further relate to a method of producing a functionalized single-layer graphene-based thin film composite membrane. The method comprises pretreating the surface of a porous substrate membrane with a first component having at least an amine functional group; drying the pretreated porous substrate membrane; and contacting the pretreated porous substrate membrane with a second component having at least a —COCl functional group that forms amide linkages with the first component deposited onto the surface of the porous substrate to form a thin film composite layer having a plurality of water channels on the said porous substrate.

In one embodiment, the surface of the porous substrate membrane is pretreated with the first component by depositing the first component onto the surface of the porous substrate membrane by means of vacuum filtration. After filtration deposition, the membrane is dried. Any suitable method known in the art can be employed to dry the membrane without departing from the scope of various embodiments of the invention.

In one embodiment, the step of contacting is carried out by exposing the surface of the pretreated porous substrate with the second component for 0.5 to 5 minutes. This allows the first component to cross-link with the second component to form the plurality of water channels. The synthetic water channels formed allow only water to pass through as they form strong inter-molecular hydrogen bonds with water molecules using their hydroxyl and acid functional groups. Unlike other methods used in fabricating graphene-based membranes, the method of some embodiments of the present invention is scalable and large-scale commercial production of functionalized graphene-based TFC membranes using the method in accordance with many embodiments of the present invention is possible without having to significantly modify the existing commercial manufacturing infrastructure and practices.

Figure 13:
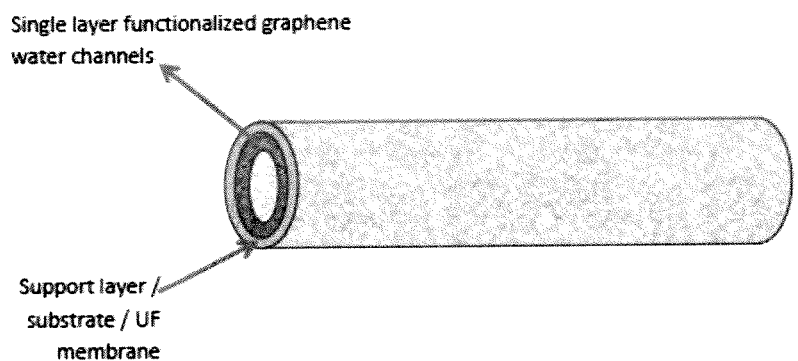
FIG. 13 shows a functionalized single-layer graphene-based TFC modified hollow fiber membrane.
Figure 14:
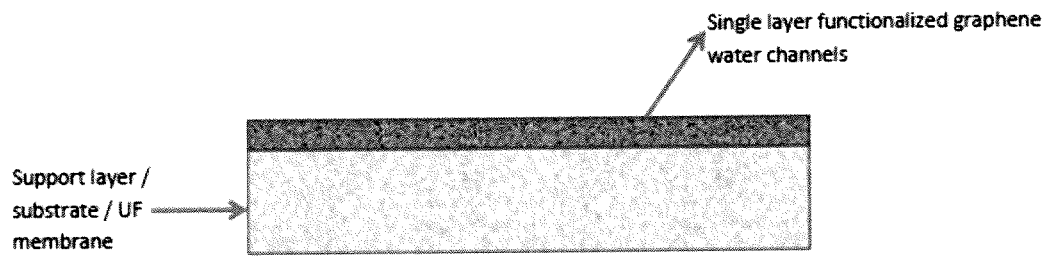
FIG. 14 shows a functionalized single-layer graphene-based TFC modified flat sheet membrane.

The method of many embodiments of the present invention may further comprise removing excess first and second components from the porous substrate membrane and heat-curing the porous substrate membrane. The membrane obtained can be further processed to any suitable configurations without department from the scope of various embodiments of the present invention. For example, the membrane may be further processed to form a hollow fiber membrane (see FIG. 13) or a flat sheet membrane (see FIG. 14).

Figure 5:
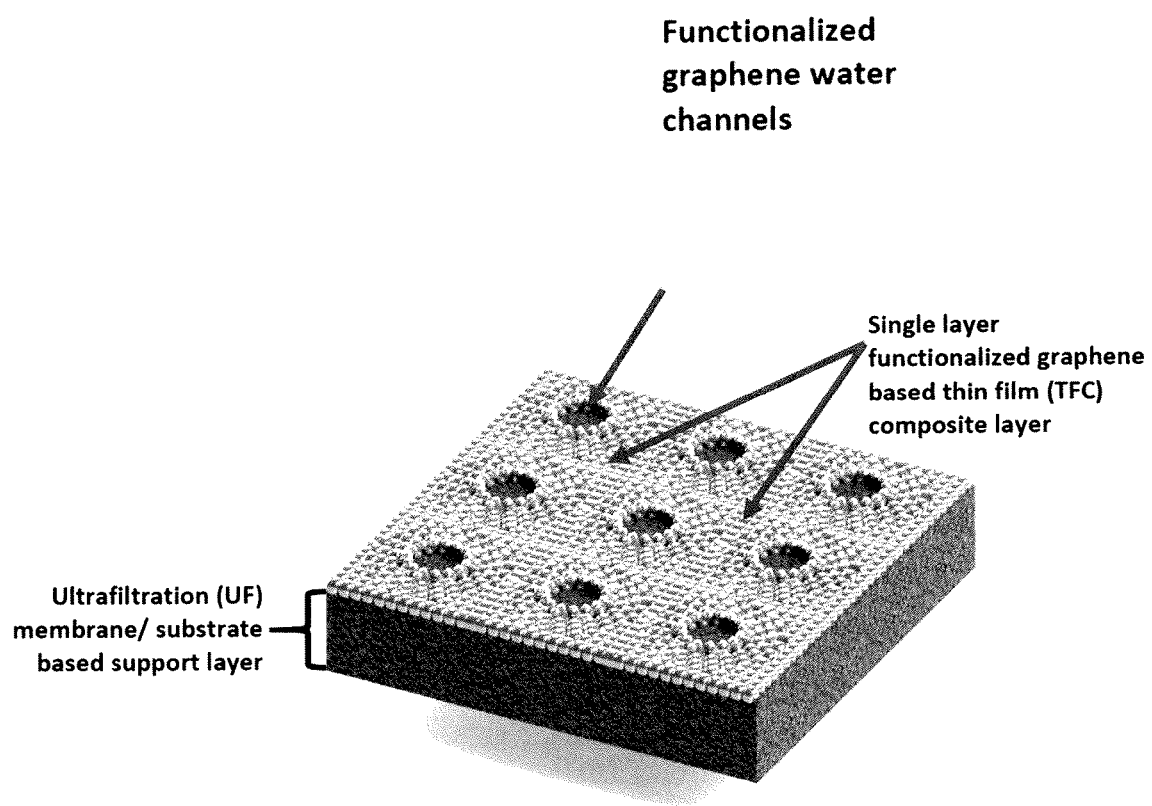
FIG. 5 is an image illustrating the functionalized graphene-based thin film composite membrane in accordance with an embodiment of the present invention.
Figure 12:
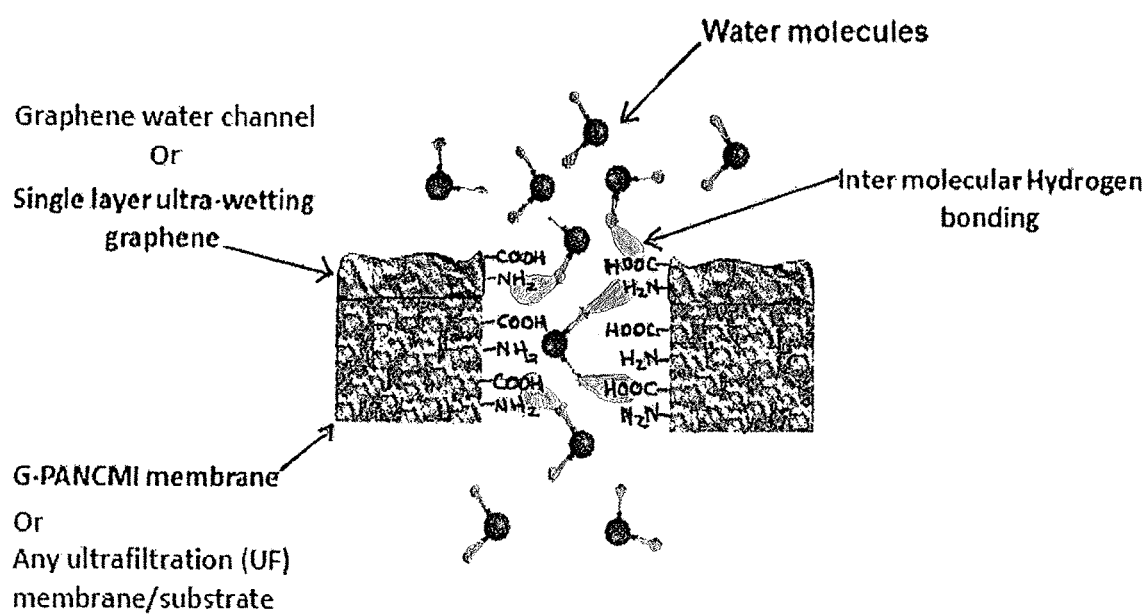
FIG. 12 illustrates the water channels formed in accordance with an embodiment of the present invention.

In accordance with some embodiments of the present invention, the unique functionalized single-layer graphene-based thin film composite comprising a plurality of water channels is deposited onto the surface of the (UF) membrane/substrate using thin film coating method (see FIG. 5). The degree of graphene functionalization and the conditions of TFC polymerization are controlled or optimized in such a way that the distance between the two adjacent components can be less than 20 nm, preferably less than 2 nm. This gap acts as a synthetic channel for water to pass through. Since the edges of the graphene nanosheets also contain hydroxyl and carboxyl moieties, the graphene nanosheets will form hydrogen bonds with water and this inter-molecular hydrogen bonding will push the water molecules through the water channels and rejecting the salts (see FIG. 12). The functionalized single-layer graphene-based thin film composite deposited onto the surface of the membrane causes the membrane to have an ultra-wetting property.

The following examples illustrate various embodiments of this invention. One skilled in the art will recognize that the examples set out below are not an exhaustive list of the embodiments of this invention.

EXAMPLE

Example 1

Synthesis of Amine and Acid Functionalized Graphene

About 1 g of pristine graphene was first treated with an excess of acid mixture comprising sulfuric acid and nitric acid ($H_2SO_4$/$HNO_3$) in a ratio of 3:1 to introduce the acid (—COOH) functional group onto the graphene surfaces. This was carried out at a temperature of 70° C. for about 4 hours. After successful oxidation of the graphene, the functionalized graphene (or acid modified graphene) was centrifuged at 12,000 rpm (for about 15 minutes), filtered and washed with excess water until the pH of the washed water was neutral. The functionalized graphene was then dried thoroughly before it was further refluxed with 150 ml of thionyl chloride ($SOCl_2$) at 80° C. for 24 hours to convert it into an acid chloride modified graphene containing the —COCl functional group. The excess thionyl chloride post-reaction was filtered off before 150 ml of ethylene diamine was added to the reaction vessel, operating under reflux at 70° C. for another 24 hours. The amine and acid functionalized graphene was then separated out by centrifugation and washed with excess ethanol to remove any unreacted reagents.

Figure 6:
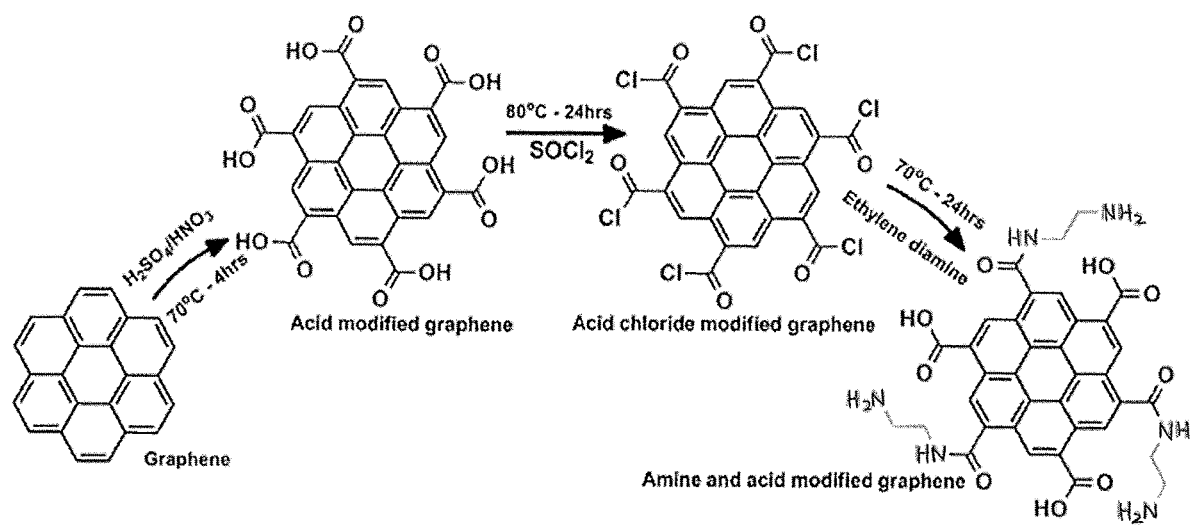
FIG. 6 is a schematic representation of the synthesis of the amine and acid functionalized graphene in accordance with an embodiment of the present invention.

FIG. 6(a) is a schematic representation of the synthesis of the amine and acid functionalized graphene.

Example 2

Formation of Synthetic Water Channels Using Functionalized Single-Layer Graphene A functionalized single-layer graphene-based synthetic water channels is developed using thin film composite (TFC) method. Functionalized single-layer graphene nanosheets (with thickness of about 2 to 10 nm) were used for the TFC coating.

The amine and acid functionalized graphene obtained in Example 1 was deposited on the surface of a substrate (for example, the G-PANCMI substrate as described in PCT/SG2015/050076) or an ultrafiltration (UF) membrane by means of vacuum filtration. Briefly, 50 ml of the amine and acid functionalized graphene aqueous solution (0.2% solution) was filtrated through the substrate for Sample-1, and a total volume of 100 ml was filtrated through the substrate for Sample-2. After filtration deposition, the membranes are kept in over at 70° C. for drying overnight.

The dried amine functionalized graphene coated membrane was cross-linked by exposing the surface layer to 0.15% of acid chloride modified graphene in hexane for 2 mins. The cross-linked membrane was then washed thoroughly with ethanol to remove any unreacted reagents and heat cured at 60° C. for 10 mins. The membrane obtained thereto was the kept in deionized water for further test. During this treatment, the reactive amine group of the functionalized graphene undergoes reaction with the acid chloride moiety of the acid chloride modified graphene and forms amide linkages through a simple condensation reaction, eliminating hydrogen chloride molecules.

Figure 9:
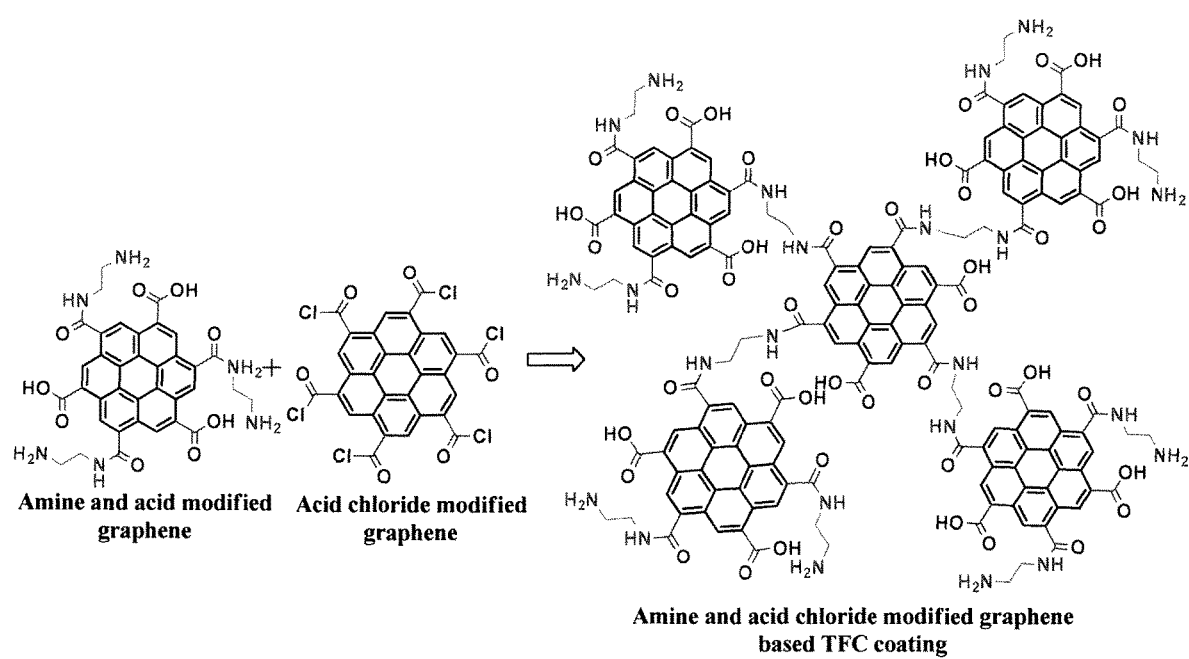
FIG. 9 shows the crosslinking mechanism and the formation of graphene-based TFC using amine and acid functionalized graphene and acid chloride functionalized graphene.
Figure 10:
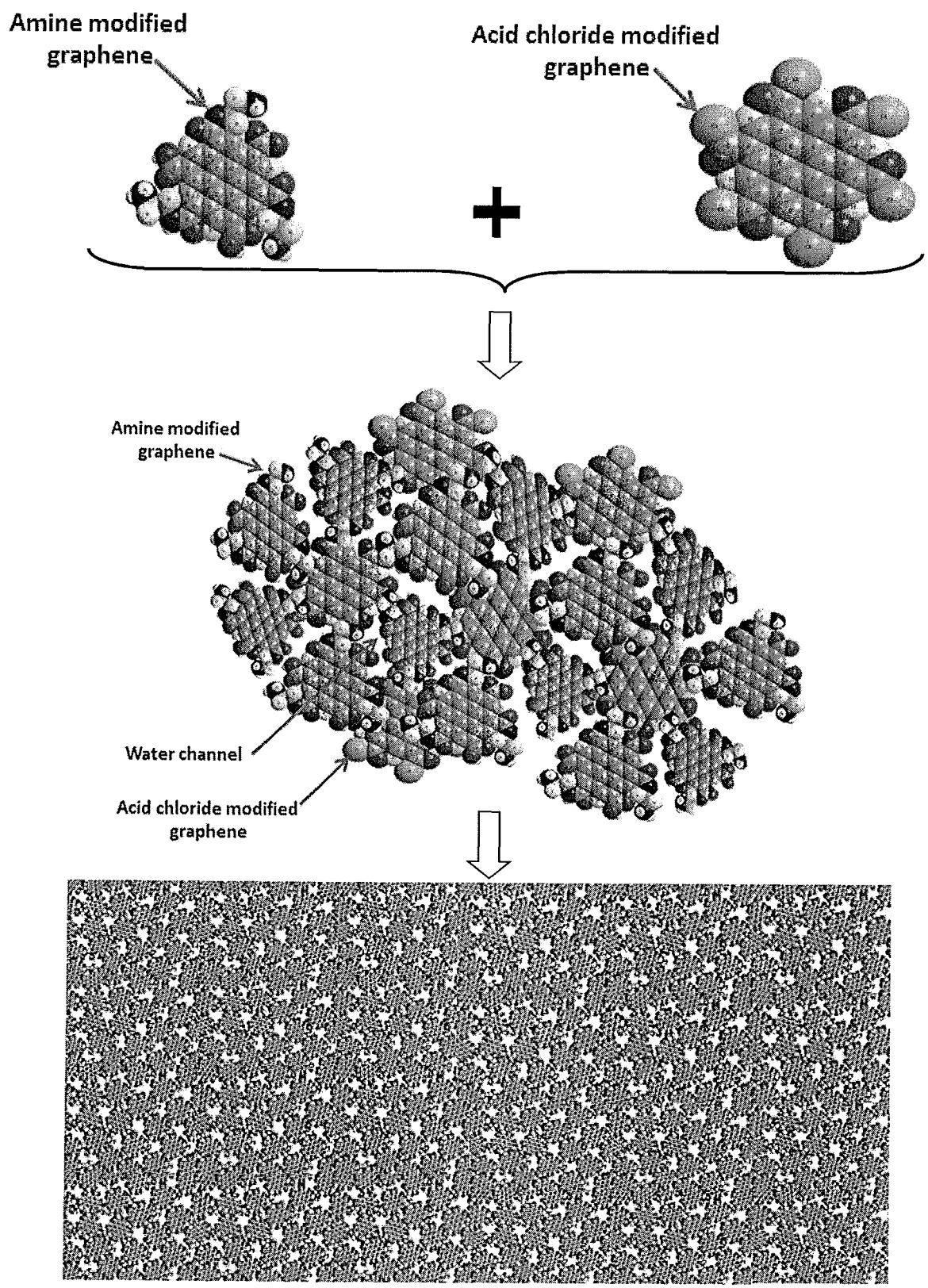
FIG. 10 is a schematic representation of the water channels formed using amine and acid functionalized graphene and acid chloride functionalized graphene.

FIG. 9 shows the crosslinking mechanism and the formation of the graphene-based TFC in accordance with the method described in this example. FIG. 10 is a schematic representation of the water channels formed using the method as described in this example.

Example 3

FTIR Analysis (Structural Confirmation)

Figure 15:
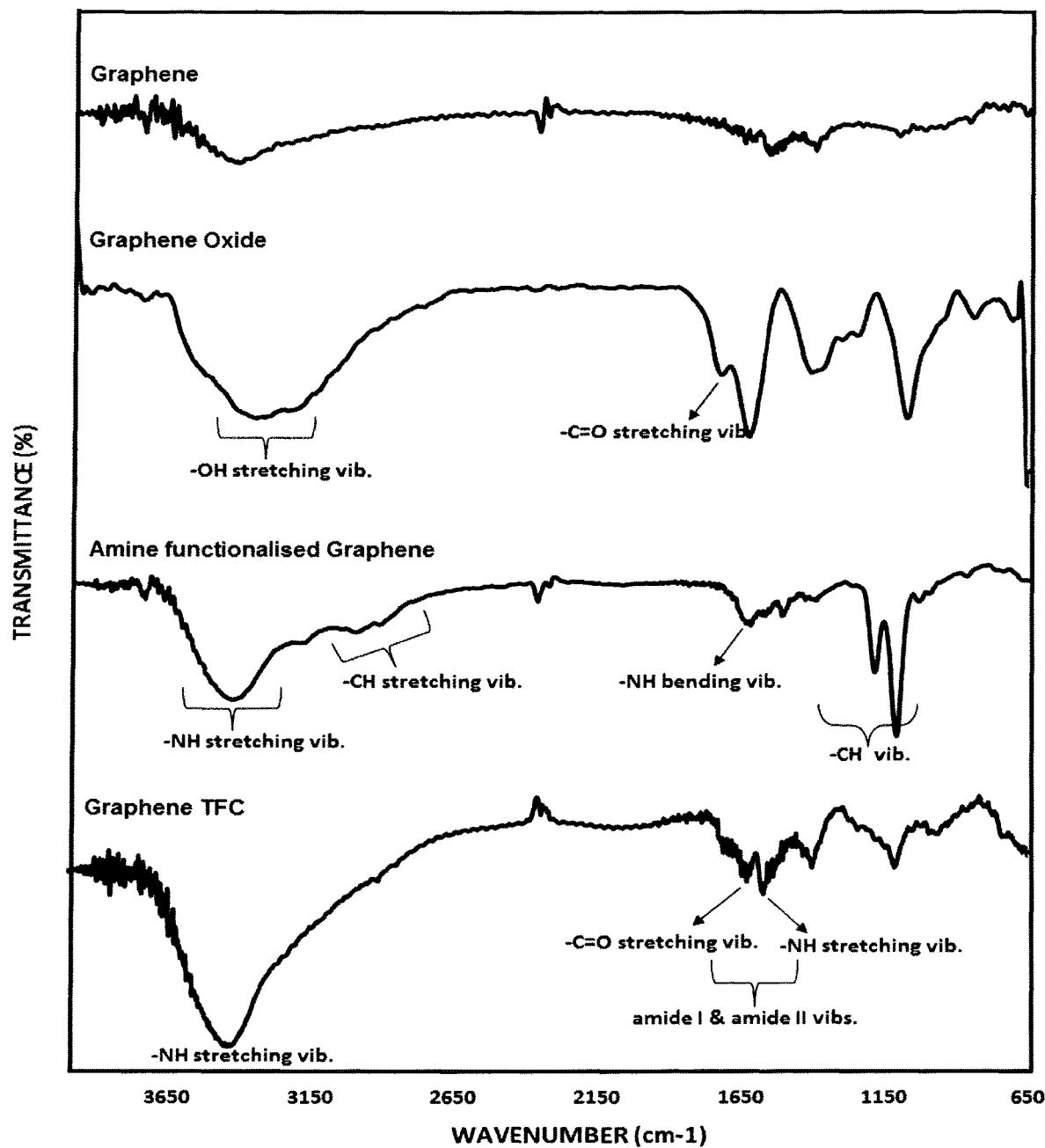
FIG. 15 shows a FTIR spectra of neat, functionalized graphene and the TFC layer.

The FTIR spectrum of graphene, GO, amine functionalized GO and the TFC membrane formed with the acid chloride and amine functionalized Graphene is shown in FIG. 15.

The FTIR spectra of graphene did not show any specific peak. However, the functionalized graphene shows intense peaks at different wavenumbers depending on the functionalities present in the graphene confirming the successful functionalization. For example, graphene oxide exhibited a broad peak at around 3423 $cm^{-1}$, corresponding to the —OH stretching vibration of acid hydroxyl group and a sharp shoulder at 1723 $cm^{-1}$ indicating the presence of —C═O (acid carbonyl) stretching vibration. Similarly, the amine functionalized graphene exhibited a broad peak at 3446 cm$^{-1}$ indicating the presence of —NH stretching vibrations and a small peak at 1650 cm$^{-1}$ corresponding to the —NH bending vibrations along with peaks at 2923 cm$^{-1}$ for —CH stretching vibrations of ethylene diamine moiety. Finally, the successful interfacial polymerization that occurred between the acid chloride modified graphene and amine functionalized graphene was confirmed by the presence of amide I (—C=O) and amide II (—NH) vibrations of (—CONH) group at around 1633 cm$^{-1}$ and 1575 cm$^{-1}$ respectively.

Raman Analysis

Figure 16:
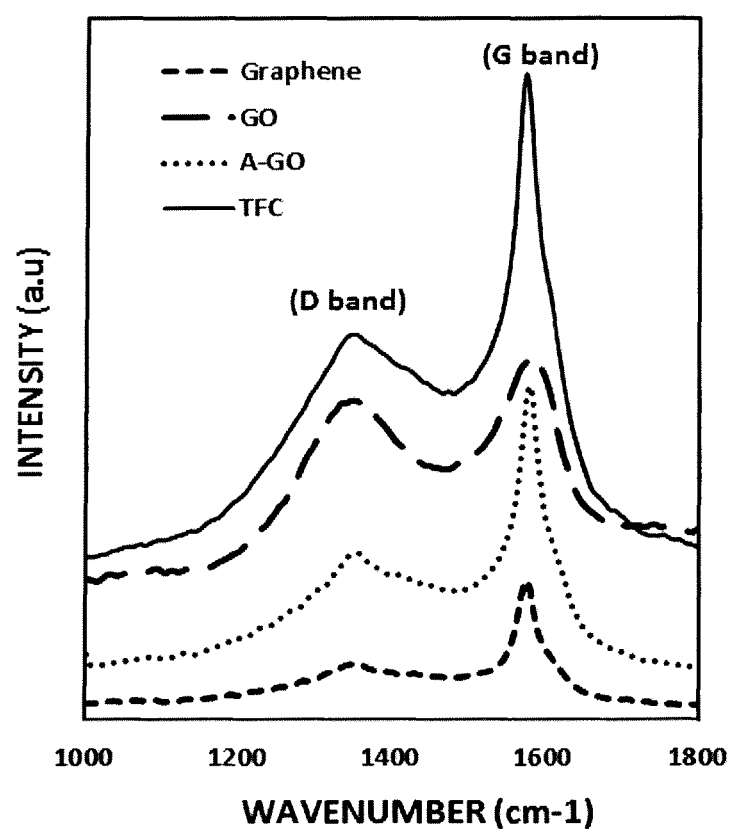
FIG. 16 shows a Raman spectra of graphene, carboxylated graphene, amine functionalized graphene and the graphene-based TFC.

FIG. 16 depicts the Raman spectra of graphene, carboxylated graphene, amine functionalized graphene and the graphene-based TFC. The D-band of all the functionalized graphene at 1357 cm$^{-1}$ was largely increased, compared with neat graphene. This is ascribed to the disordered or defect structure of modified graphene resulted by specific functionalization of graphene. The G-band, which corresponds to graphitic structure, became broaden for all the functionalized graphene, compared with that of neat graphene. These results confirm the successful functionalization of graphene and formation of TFC using the functionalized graphene.

Example 4

Morphology Analysis

Figure 17:
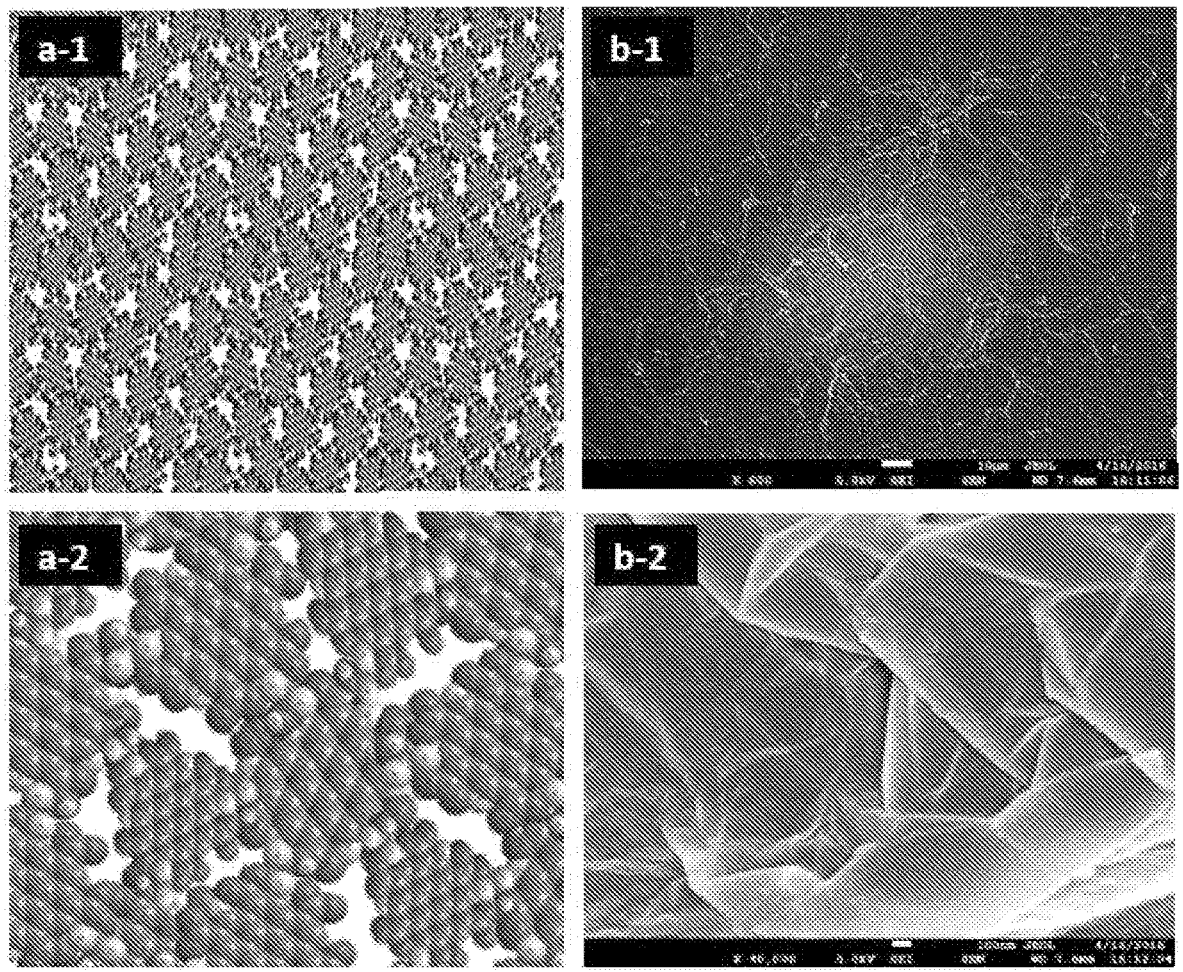
FIG. 17 shows the 3D modeling a-1, magnified 3D modelling a-2 and actual scanning electron microscopic (SEM) image of the graphene based TFC modified membrane surface b-1 and magnified SEM image b-2.

FIG. 17 shows the 3D modeling a-1, magnified 3D modeling a-2 and actual scanning electron microscopic (SEM) image of the graphene based TFC modified membrane surface b-1 and magnified SEM image b-2. At a magnification of 600×, the membrane (figure: a-1) shows a smooth surface with homogeneous distribution of acid chloride and amine modified graphene based TFC layer. Wrinkles are regularly formed at the edges when one modified graphene sheet is entangled with the other at the edges. Because the gap between two sheets are in the sub-nano range, such structure favors water to pass through but reject salt ions due to the tortuous and confined sub-nano pores. b-2) An enlarged FESEM image at 80,000× magnification, showing a typical wrinkled edge formed between two or more modified graphene sheets.

Figure 18:
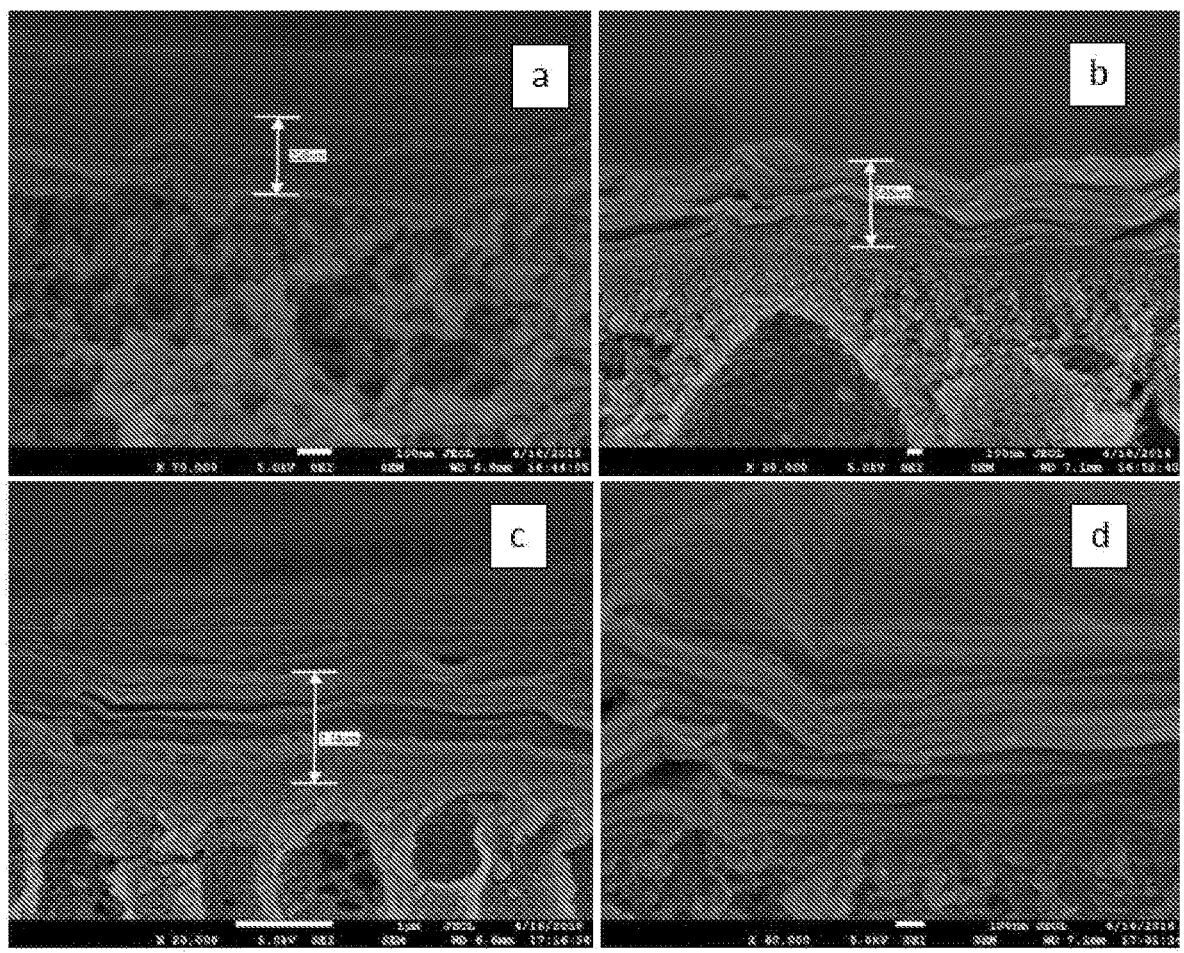
FIG. 18 shows the cross-section SEM image of the membrane, showing the graphene-based TFC layer thickness of a) 226 nm; b) 588 nm; and c) 1.14 microns.

FIG. 18 is a cross-section SEM image of the membrane showing the graphene based TFC layer thickness of a) 226 nm; b) 588 nm; and c) 1.14 microns. Below the graphene-based TFC selective layer, a sponge-like membrane substrate formed by phase inversion is shown. FIG. 18 d) shows a higher magnification image (60,000×) illustrating that the modified graphene has a layer-by-layer stacked structure which is formed by the TFC crosslinking. The modified graphene-based TFC layer allows water to pass through but rejects salt ions.

Example 5

Membrane Performance Analysis
Salt Filtration Test:

The salt filtration test was carried out with a dead-end filtration cell with an effective area of 8 cm$^2$ and the results are summarized in Table 1 below.

The salt concentration used was 300 ppm for sodium chloride (NaCl) and 400 ppm for sodium sulfate (Na$_2$SO$_4$). The operation pressure was kept constantly at 0.85 bar. Salt rejection was calculated by dividing the TDS difference between the feed solution and the permeate solution with the TDS of the feed solution.

TABLE 1

Filtration flux and salt rejection

| | TFC layer thickness (nm) | Rejection NaCl (300 ppm) | Rejection for Na$_2$SO$_4$ (400 ppm) | Filtration flux (LMH/Bar) | Operation pressure (Bar) |
|---|---|---|---|---|---|
| Sample-1 | 225 ± 15 | 15 ± 2% | 75 ± 2.1% | 66.6 ± 5.2 | 0.85 |
| Sample-2 | 570 ± 20 | 49.8 ± 3.2% | 91 ± 3% | 11 ± 2.6 | 0.85 |

Example 6

Formation of Functionalized Single-Layer Graphene-Based TFC Layer Using Amine Modified Graphene and Trimesoyl Chloride (TMC)

Initially, the substrate/UF membrane surface was treated with aminated graphene and then allowed to be in contact with trimesoyl chloride (TMC) (instead of TMC, any reactant (material) with reactive chloride (more particularly acid chloride/—COCl) functionality that can form amide linkages with amine functional group can be used) for 30 sec to 5 min in room temperature followed by which, the membrane was immersed in deionized water to remove the excess or unreacted TMC and functionalized graphene from the membrane surface. During this treatment, the reactive amine groups of the graphene undergo reaction with the chloride moiety of the TMC and forms amide linkages through a simple condensation reaction, eliminating hydrogen chloride molecules.

Figure 7:
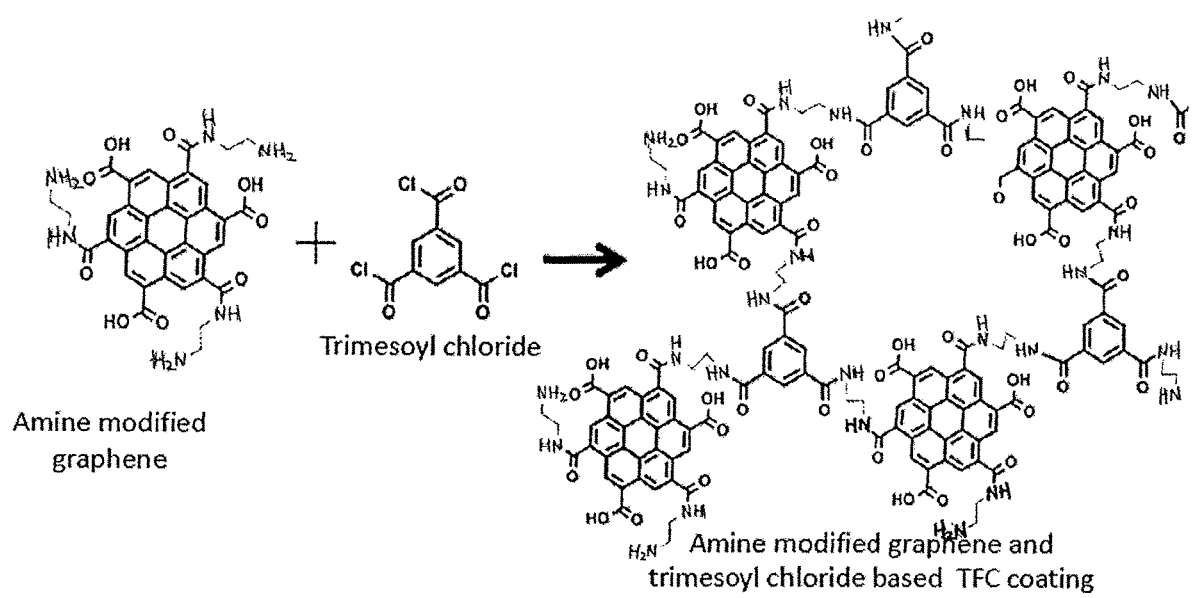
FIG. 7 shows the crosslinking mechanism and formation of graphene-based TFC using amine and acid functionalized graphene and trimesoyl chloride.
Figure 8:
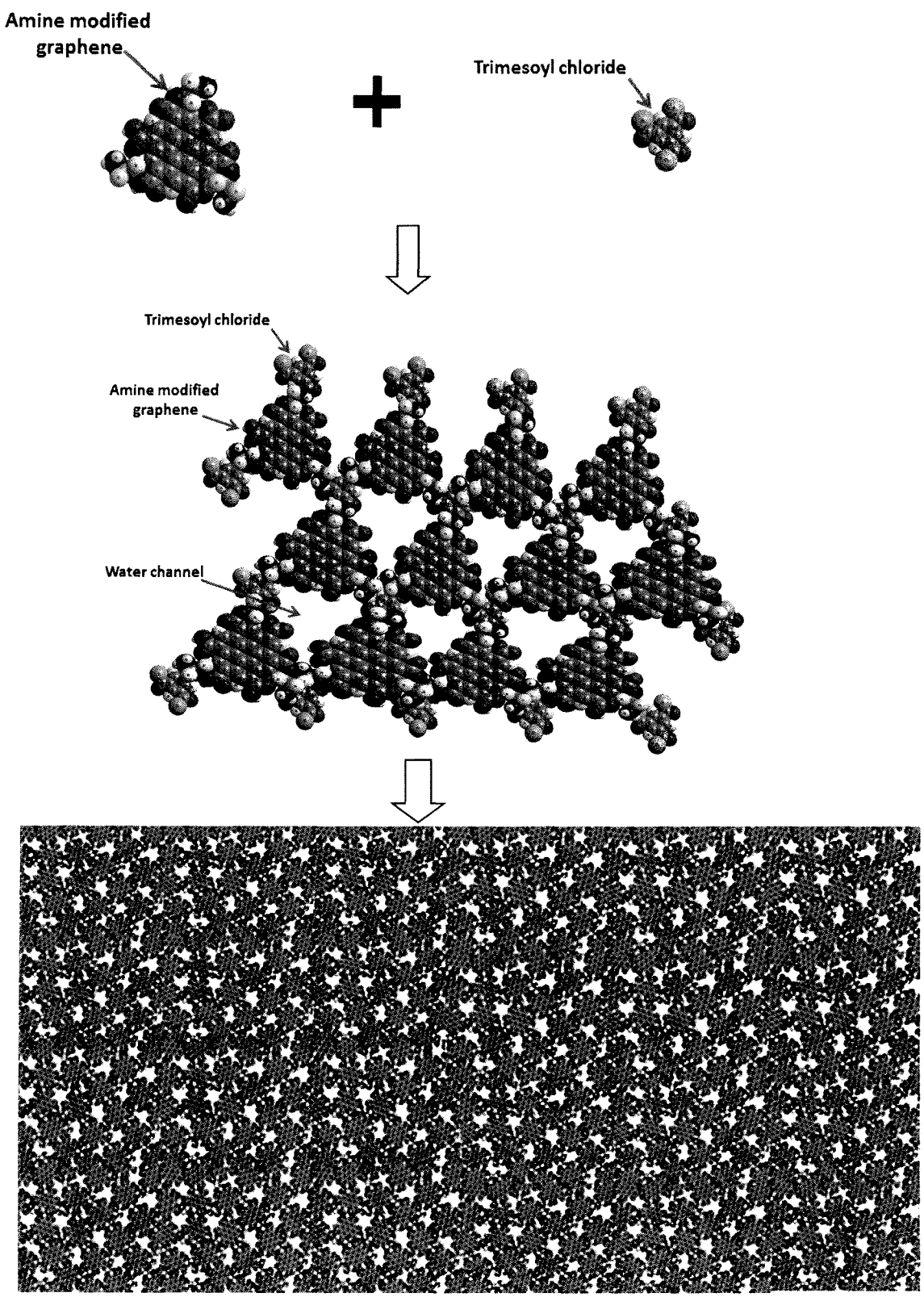
FIG. 8 is a schematic representation of the water channels formed using amine and acid functionalized graphene and trimesoyl chloride.

FIG. 7 shows the crosslinking mechanism and formation of graphene based TFC using amine and acid modified graphene and trimesoyl chloride. FIG. 8 is a schematic representation of the water channels formed using amine and acid modified graphene and trimesoyl chloride.

Example 7

Formation of Functionalized Single-Layer Graphene-Based TFC Layer Using Acid Chloride Functionalized Graphene and Meta Phenylene Diamine (MPD)

In this method, the substrate/UF membrane was immersed in water overnight. The wet membrane was then allowed to be in contact with meta phenylene diamine (MPD) dissolved in water for about 5-10 mins at room temperature. After about 5 to 10 mins, the membrane surface was treated with acid chloride functionalized graphene for 1 min in room temperature. This was followed by immersing the membrane in deionized water to remove the excess or unreacted MPD and acid chloride functionalized graphene from the membrane surface. During this treatment, the reactive amine groups of the MPD undergo reaction with the acid chloride functionalized graphene and form amide linkages through a simple condensation reaction, eliminating hydrogen chloride molecules.

Figure 11:
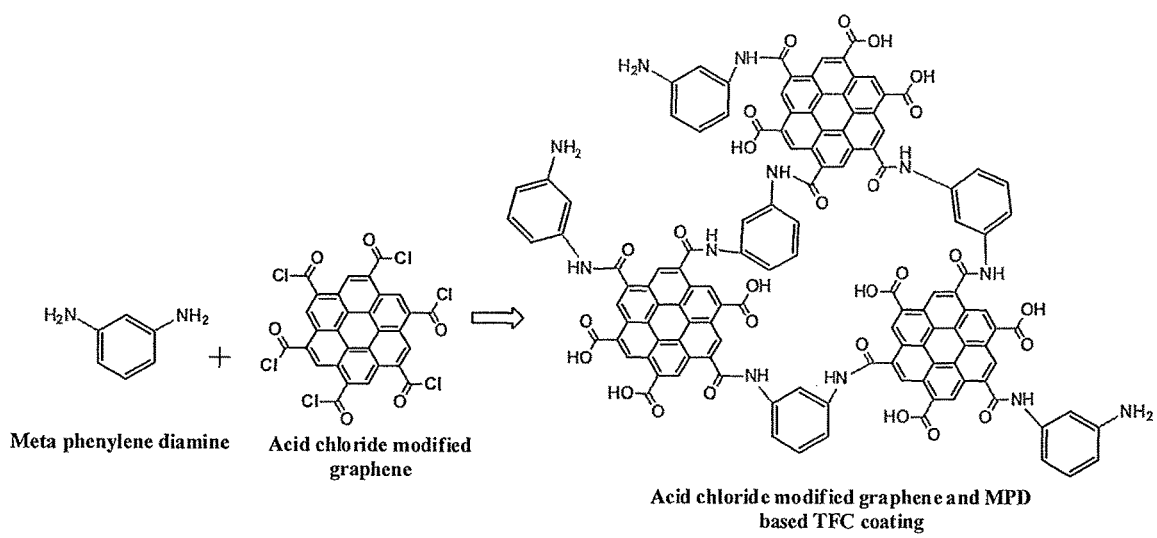
FIG. 11 shows the crosslinking mechanism and formation of the graphene-based TFC using acid chloride functionalized graphene and meta phenylene diamine (MPD).

FIG. 11 shows the crosslinking mechanism and formation of the graphene based TFC layer using acid chloride functionalized graphene and meta phenylene diamine (MPD).

The above is a description of the subject matter the inventors regard as the invention and is believed that those skilled in the art can and will design alternative embodiments that include of this invention as set forth in the following claims.

The invention claimed is:

1. A functionalized single-layer graphene-based thin film composite comprising a first component functionalized with amine and acid functional groups and a second component having at least a —COCl functional group that forms amide linkages with the first component to form a plurality of water channels within the thin film composite,
   wherein the first component and the second component are each a graphene, functionalized with the respective functional group(s) and the graphene is selected from the group consisting of exfoliated graphene nanoplatelets, pristine graphene, graphene nanosheets, functionalized graphene and chemically converted graphene; and
   wherein the second component is an acid chloride modified graphene.

2. The functionalized single-layer graphene-based thin film composite according to claim 1, wherein the plurality of water channels having an average diameter ranging from 0.001 to 100 nm.

3. The functionalized single-layer graphene-based thin film composite according to claim 2, wherein the plurality of water channels having an average diameter ranging from 0.01 to 20 nm.

4. A graphene-based thin film composite membrane comprising:
   (a) a porous substrate; and
   (b) a functionalized single-layer graphene-based thin film composite comprising a first component functionalized with amine and acid functional groups and a second component having at least a —COCl functional group that forms amide linkages with the first component to form a plurality of water channels within the thin film composite,
   wherein the first component and the second component are each a graphene, functionalized with the respective functional group(s) graphene nanoplatelets, pristine graphene, graphene nanosheets, functionalized graphene and chemically converted graphene; and
   wherein the second component is an acid chloride modified graphene.

5. The graphene-based thin film composite membrane according to claim 4, wherein the porous substrate is an ultrafiltration membrane or a microfiltration membrane fabricated from material selected from the group consisting of polysulfone, cellulose acetate, polyvinyl alcohol, polyvinyl chloride, polyvinylidene fluoride, cellulose nitrate, polyethersulphone and poly acrylonitrile.

6. The graphene-based thin film composite membrane according to claim 4, wherein the functionalized single-layer graphene-based thin film composite having a thickness ranging from 2 nm to 2,000 nm.

7. The graphene-based thin film composite membrane according to claim 4, wherein the graphene-based thin film composite membrane is a hollow fiber membrane.

8. The graphene-based thin film composite membrane according to claim 4, wherein the graphene-based thin film composite membrane is a flat sheet membrane.

9. The graphene-based thin film composite membrane according to claim 4, wherein the plurality of water channels having an average diameter ranging from 0.001 nm to 100 nm.

10. The graphene-based thin film composite membrane according to claim 9, wherein the plurality of water channels having an average diameter ranging from 0.01 nm to 20 nm.

11. A method of producing a functionalized single-layer graphene-based thin film composite membrane, the method comprising:
   (i) pretreating the surface of a porous substrate membrane with a first component functionalized with amine and acid functional groups;
   (ii) drying the pretreated porous substrate membrane; and
   (ii) contacting the pretreated porous substrate membrane with a second component having at least a —COCl functional group that forms amide linkages with the first component deposited onto the surface of the porous substrate to form a thin film composite layer having a plurality of water channels on the said porous substrate,
   wherein the first component and the second component are each a graphene, functionalized with the respective functional group(s), and the graphene is selected from the group consisting of exfoliated graphene nanoplatelets, pristine graphene, graphene nanosheets, functionalized graphene and chemically converted graphene; and
   wherein the second component is an acid chloride modified graphene.

12. The method according to claim 11, wherein the step of contacting is carried out for 0.5 to 5 minutes.

13. The method according to claim 11, further comprising:
   removing excess first and second components from the porous substrate membrane; and
   heat-curing the porous substrate membrane.

14. The method according to claim 13, wherein the excess first and second components are removed from the porous substrate membrane by washing the porous substrate membrane with ethanol.

15. The method according to claim 11, wherein the plurality of water channels having an average diameter ranging from 0.001 nm to 100 nm.

16. The method according to claim 15, wherein the plurality of water channels having an average diameter ranging from 0.01 nm to 20 nm.

* * * * *